Nov. 23, 1937.   E. H. LAND   2,099,694
POLARIZING OPTICAL SYSTEM
Filed March 6, 1934
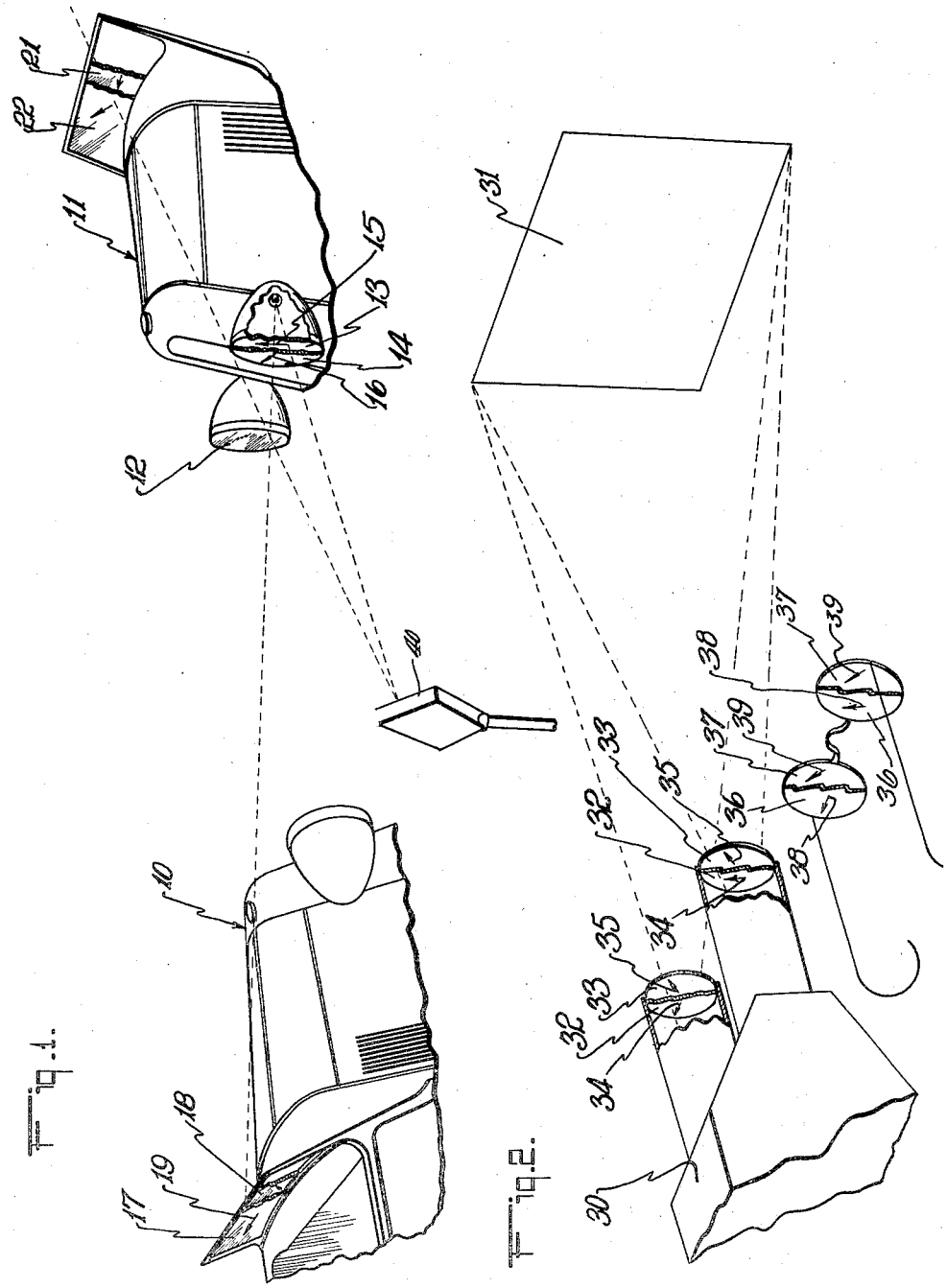

Patented Nov. 23, 1937

2,099,694

UNITED STATES PATENT OFFICE 2,099,694

POLARIZING OPTICAL SYSTEM

Edwin H. Land, Wellesley Farms, Mass., assignor to Sheet Polarizer Company, Inc., Union City, N. J., a corporation of New Jersey Application March 6, 1934, Serial No. 714,239

13 Claims. (Cl. 88—16.6)

This invention relates to new and improved optical systems employing polarized light, and more specifically to such systems employing circularly polarized light. When the electric intensities in a plane normal to a ray of light have certain determinable directions, as a function of time, the light is termed polarized. If these electric intensities in polarized light are of the same period and reach their maximum at the same instant, the light is said to be plane polarized. When two rectangular plane polarized vibrations of the same period are compounded, which differ in phase by 90° and are of equal amplitude, the type of vibration resulting is said to be circularly polarized light. The equations of such a compound vibration may be written in the form $$x = a \cos \omega t; \quad y = a \sin \omega t$$

and the vibration is said to be left-handed or counter-clockwise. Or the equations may be $$x = a \cos \omega t; \quad y = -a \sin \omega t$$

and the vibration is said to be right-handed or clockwise.

An object of the invention is to provide in connection with a source of specially polarized light, i. e., either circularly or elliptically polarized light, but not plane polarized light, an analyzer which is substantially opaque to the said specially polarized light, and yet which is substantially transparent to all light which has not been so polarized.

A further object of the invention is to provide a plurality of sources of circularly polarized light, the direction of rotation of the plane of vibration differing in the light emitted from each source, and in combination therewith a plurality of analyzers, one adapted to transmit light emanating from one of said sources and to block light emanating from the second of said sources, the other analyzer being adapted to transmit light emanating from said second source and to block light emanating from the first of said sources.

A further object of the invention is to provide an optical system of the type described in which the analyzers function in the manner described irrespective of the position of their axes in a plane normal to a ray of circularly polarized light.

A further object of the invention is to provide apparatus for use in connection with stereoscopic motion pictures, including means to project superimposed images upon a screen, one image being formed of a beam of clockwise circularly polarized light, the other image being formed of a beam of counter-clockwise circularly polarized light, and viewing means cooperating therewith and comprising a plurality of viewing screens, one for each eye of the observer, one of said screens being adapted to transmit one of said images and to block the other, the other of said screens being adapted to transmit that image blocked by the first screen and to block the image transmitted by the first screen.

A still further object of the invention is to provide an optical system for the elimination of glare from the headlights of automobiles comprising, in combination, means to circularly polarize the beams of light emanating from the headlights and cooperating visor means adapted to block the beams emanating from the headlight of an approaching car but yet adapted to transmit, without appreciable loss, specularly-reflected beams which emanated originally from the headlights of the car provided with said visor.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Figure 1 is a diagrammatical representation in perspective with parts broken away, illustrating an application of the invention to the problem of automobile headlight glare elimination; and Fig. 2 is a diagrammatical representation, partly in perspective with parts broken away, showing an application of the invention to the problem of stereoscopic motion picture projection.

It has heretofore been suggested that plane polarized light be employed in the elimination of glare from automobile headlights and in the projection of stereoscopic motion pictures, and in similar applications. An example of the use of plane polarized light in automobile headlight glare elimination is shown in my co-pending application Serial No. 331,967, filed January 12, 1929. An example of the use of plane polarized light in stereoscopic motion picture projection is disclosed in my pending application Serial No. 626,249, filed July 29, 1932. These and similar applications of the use of plane polarized light are highly successful so long as the polarizing axes of the visor or viewing screens are not rotated with respect to the position of the polarizing axes of the polarizing screen interposed in the path of the projected beam. However, in both the cases mentioned situations arise where the relative positions of the polarizing axes of the viewing screens and the screen in the path of the projected beam are altered. For example, in connection with the elimination of glare from automobile headlights, where plane polarized light is employed, whenever the two cars approach on a highly crowned or convex road, the alteration in the relative positions of the viewing screen of one car and the headlight screen on the approaching car results in a noticeable brightening of the headlight intensity.

So also, in connection with stereoscopic motion picture projection, if plane polarized light is employed, whenever the observer tips his head so that the polarizing axes of the viewing glasses are shifted with respect to the polarizing axes of the projector, there is an increasing tendency, as the inclination of the head laterally increases, for each eye of the observer to receive some light from each of the projected images, tending to destroy not only the stereoscopic effect, but imparting a noticeable blur and double image.

This invention contemplates the provision of apparatus utilizing an utterly different phenomenon,—polarized light which is not plane polarized, to the end that the objections outlined in connection with the use of plane polarized light, may be overcome.

For example, where a suitable source of circularly polarized light is employed, as in the headlights of an automobile, and where suitable viewing visors of the type hereinafter described are used in connection therewith, the glare from the headlights can be substantially eliminated, even though the approaching cars pass on a highly crowned road. In a system such as is here described, considerable alterations in the relative positions of the axes of the screens associated with the light source and the viewing visor have substantially no effect on the intensity of the beam transmitted by those screens.

An analyzer for circularly polarized light such as is hereinafter described and which is substantially opaque to that beam in any given position, will remain substantially opaque to that beam even though the analyzer be rotated through an angle, for example, of 90°. So also, if the analyzer is transparent to a circularly-polarized beam in any given position, it will remain transparent to that beam even though it be rotated.

In the application of the use of polarized light to stereoscopic motion picture projection, the use of circularly-polarized beams and suitable analyzers possesses the distinct advantage that the observer may tilt his head from side to side without doubling or blurring the image in any way.

In the application of the invention shown in Fig. 1, which illustrates an automobile headlight-glare elimination system, 10 and 11 indicate approaching automobiles, the headlights of each of which are equipped with screens 12 adapted to emit circularly polarized light, the direction of vibration of which, in any plane perpendicular to the light ray, changes in a clockwise direction, for example, as viewed from the emitting screens. It will be understood that the change of direction of vibration within the circularly polarized beams may be either clockwise or counter-clockwise, provided, however, that the headlights of all the cars are similarly equipped. A suitable screen adapted to impart such a property to the emitted beam may comprise a plane-polarizing element 13 and a quarter wave plate 14, which, if desired, may be mounted in intimate contact. The plane-polarizing element should be mounted between the light source and the quarter wave plate. The quarter wave plate should be mounted with its axes at an angle of 45° to the polarizing axis of the polarizing element. For example, if the polarizing axis of the polarizing element 13 is vertical, as indicated by the arrow 15 in Fig. 1, then the quarter wave plate should be so mounted that its axes are at an angle of 45° to the vertical, as shown, for example, by the arrow 16 in Fig. 1.

Throughout the drawing, the arrows illustrating the position of the axes of the quarter wave plates employed are illustrative of corresponding axes. It will be understood that in the systems described, if all the quarter wave plates are rotated through an angle of 90°, the ultimate effect of the co-operating elements is not altered.

A suitable visor or windshield screen for viewing directly and blocking circularly polarized light emitted from a headlight equipped in the manner described, may comprise a plane-polarizing element 17 and a co-operating quarter wave device 18. The quarter wave device should here be positioned between the polarizing element and the light source. A preferred arrangement of the polarizing element and the quarter wave plate on the viewing screen or visor contemplates the positioning of the polarizing element with its polarizing axis, indicated by the arrow 19, positioned at right angles to the polarizing axis of the polarizing element 13 associated with the light source. Under these circumstances, the quarter wave device associated with the viewing screen should be so mounted that its axes are at angles of 45° to the polarizing axis of the polarizing element associated therewith, and with its axes at right angles to the corresponding axes of the quarter wave plate associated with the light source being viewed.

It is to be understood that while the quarter wave plates should be positioned with respect to their associated polarizers in the manner described, that is, with their axes at angles of 45° to the polarizing axis of the polarizers, when circularly polarized light is employed, it is not necessary that the emitting screen and viewing screen be positioned with respect to each other in the manner which has been described. Such a viewing screen as has been described will function substantially to block light emitted through such an emitting screen as has been described, irrespective of the relative positions of the axes of the polarizing elements of the two screens, it being understood, however, that the quarter wave plate associated with each of the polarizing elements should bear the same relation to that element as has been described. The preferred relative positions of the viewing screen and emitting screen have, however, been described as one in which the relative polarizing axes are at 90°, even though neither polarizing axis be either vertical or horizontal It will be noted, also, that the elements which have been described as forming the viewing screen, if used in the manner in which the elements forming the emitting screen are employed, would emit a beam of circularly polarized light, the circular polarization of which would be reverse to the circular polarization of light emitted from the emitting screen described, i. e., if the emitting screen circularly polarizes light with a clockwise polarization, then a viewing screen adapted to block that circularly polarized light would, if employed as an emitting screen, circularly polarize the beam with a counter-clockwise polarization.

The described position of a viewing screen with respect to the emitting screen is shown in Fig. 1, where 21 represents the polarizing element of such a screen, and 22 represents its associated quarter wave plate.

In Fig. 1 the element 40 represents an object, such as a traffic marker, which reflects light specularly. Light which leaves the headlights of a car equipped with the above described devices, when it is reflected from such a marker, passes back through the wind-shield of the car from which that light arose.

It will be noted that on any given car where the screens are employed in the manner which has been described, the axes of the quarter wave plates associated with the emitting screen and the viewing screen are parallel, while the axes of the polarizing elements associated with the respective screens are perpendicular. It will be understood that these positions are not essential. An equally efficient position is where the polarizing axes of the respective polarizing elements are parallel and the corresponding axes of the respective quarter wave plates are at right angles to each other. It will be understood also that any intermediate position may be employed.

It should be understood that with a system such as has been described, it is not necessary that all cars be identically equipped in so far as the alignment or positioning of their respective polarizing and viewing screens is concerned. It is essential only that all cars be equipped with similar screens for emitting screens and with similar screens for viewing screens. The position of their axes is not important, for, as has been pointed out, a viewing screen which blocks the circularly polarized beam emitted in any one position will block it in any other position.

A suitable polarizing element for use in connection with the optical systems described may embody a set suspension of polarizing particles in any suitable suspending medium, as, for example, cellulose acetate. The polarizing particles employed may comprise, for example, any suitable polarizing periodide, such as particles of purpureocobaltchloridesulphateperiodide, or of herapathite or of anilinesulphateperiodide; in fact, any suitable polarizing particles may be employed. It will be understood also that although the preferred form of polarizer comprises a structure such as has been described and such as is shown, for example, in the issued patent to Land and Friedman No. 1,918,848, other suitable polarizing elements may be employed. For example, in connection with the light-emitting screens, polarizing elements such as are shown in my co-pending application Serial No. 684,108 filed August 7, 1933, may be employed.

The quarter wave plate may comprise any device which introduces a quarter wave retardation to the transmitted beam, such, for example, as a suitable double refracting material, or a Fresnel rhomb. A preferred quarter wave plate may comprise a set sheet of oriented cellulose, or cellulosic material, of such thickness as to impart a quarter wave retardation to the transmitted beam. A set suspension of suitable double refracting particles properly oriented in the suspending medium may also be employed. It is to be understood that any other method of rendering plane polarized light circularly polarized, such as the method of metallic reflection, will be deemed to fall within the scope of this invention.

A preferred emitting screen or viewing screen may comprise a polarizing element of the type described having mounted thereon or otherwise affixed thereto a quarter wave plate of the type described, the two elements being so affixed to or mounted upon each other that rotation of either will effect a similar rotation of the other. The polarizing element may be affixed to the quarter-wave retardation device by any suitable light-transmitting adhesive or cement or by bonding the polarizing element to the wave-retardation sheet by means of heat and pressure, or under certain circumstances by the application of a small amount of a solvent to the contacting surfaces. In the claims the expression "binding layer" will be understood as including a bond effected by the addition of an adhesive or cement, or a bond effected without the addition of such other material as aforesaid. It should be understood that if circularly polarized light is to be produced, the polarizing axis of the polarizing element should be positioned at an angle of 45° to the axes of the quarter wave plate.

While the optical system heretofore described has been referred to as employing circularly polarized light, it will be understood also that somewhat similar effects may be obtained by the use of an emitting screen adapted to elliptically polarize the emitted beam, so that it is neither plane polarized nor circularly polarized, and by the use of a suitable co-operating viewing visor, and that it is within the scope of this invention to employ emitting screens and viewing visors adapted to utilize elliptically polarized light which is neither plane polarized nor circularly polarized. It will be understood that with circularly polarized light, a suitable viewing screen may be opaque to a correspondingly suitable emitting screen, irrespective of the positions of their respective axes. With the use of elliptically polarized light, however, if the viewing visor is rotated with respect to the emitting screen from a point of maximum opacity, there is a tendency for the viewing screen to become less opaque to light emitted from the emitting screen until a point of maximum brightness is reached. It will be understood that the preferred embodiment of the invention contemplates the use of circularly polarized light, and if elliptically polarized light is used, that the advantages of the invention become less pronounced as the eccentricity of the ellipse increases.

With the use of circularly polarized light in connection with automobile headlight glare elimination, the glare from the headlights of an approaching car may be substantially eliminated not only while the cars remain on a level, uncrowned road, but also if the cars approach on a steeply crowned or tipped road, so that each car is tipped from the horizontal. Furthermore, with this system, light which is emitted from the headlight of any car and which is specularly reflected may be transmitted through the windshield screen of that car without loss. It will be obvious also that inasmuch as the system operates irrespective of the relative positions of the axes of the emitting screens and viewing visors, great care need not be taken in mounting the headlight screens or viewing visors. Furthermore, with the use of an optical system such as has been described, the driver of one car may even see through the windshield of an approaching car.

In Fig. 2 is shown a second modification of the invention and the application of an optical system such as has been described to stereoscopic motion picture projection. In the drawing 30 represents a projecting device adapted to project, for example simultaneously, a plurality of superimposed images on a suitable screen 31. In the embodiment of the invention shown here, each image is formed of circularly polarized light, but one of the two images which are simultaneously projected is formed of clockwise circularly polarized light while the other image is formed of counterclockwise circularly polarized light. This effect may be obtained by introducing in the path of each of the projected beams a suitable light polarizing element and a quarter wave device. The difference in character of the polarized beams may be accomplished, as shown, by positioning the polarizing elements at angles of 90° to each other, while maintaining the corresponding axes of the quarter wave devices parallel to each other. It should be borne in mind here also that in connection with each of the screens interposed in the path of the projected beams, the axes of the quarter wave devices should be at an angle of 45° to the polarizing axes of the associated polarizing element.

In the drawing, 32 represents the plane polarizing elements employed, and 33 represents the quarter wave devices. The arrows 34 represent the polarizing axes of the polarizing elements, and the arrows 35 represent the corresponding axes of the quarter wave devices.

Co-operating with the projectors just described, a viewing screen or screens are used by the observer, one for each eye, one screen being adapted to transmit clockwise circularly polarized light, the other screen being adapted to transmit counter-clockwise circularly polarized light, and each screen being adapted to substantially block circularly polarized light transmitted by the other screen. Preferred viewing screens may comprise plane-polarizing elements with their polarizing axes positioned at right angles to each other and associated therewith quarter wave devices with their respective axes parallel to each other but positioned at angles of 45° to the polarizing axes of the associated polarizing elements. The viewing screens may preferably be positioned, when the projecting screens are positioned in what has heretofore been described as a preferred manner, so that the respective axes of the quarter wave devices associated therewith are at right angles to the corresponding respective axes of the quarter wave devices associated with the projecting screens. In the drawing 36 represents the polarizing elements associated with the viewing screens, 37 represents the quarter wave devices associated with the viewing screens, the arrows 38 represent the direction of the polarizing axes of the polarizing elements 36 and the arrows 39 represent the direction of the axes of the quarter wave elements 37.

It will be obvious, for the reasons explained in connection with the application of the invention to automobile headlight glare elimination, that the relative positions of the axes of the viewing screens and of the projecting screens may be altered without departing from the invention, for that viewing screen which is adapted to transmit light circularly polarized clockwise and which is adapted to block light circularly polarized counter-clockwise will so function irrespective of the position of its axis with respect to the axis of the projecting screens. The same is of course true of the other viewing screen.

The application of this invention is stereoscopic motion pictures possesses certain distinct advantages. Where plane polarized light is employed, the observer must keep his head in a fairly vertical position so that a straight line passing through the eyes is substantially horizontal, for if the observer tips his head sideways from the vertical, the effective position of the planes of polarization of the viewing screens becomes so altered that some light from each of the projected images may be transmitted through each viewing screen, with the result that the observer tends to see a double image, and that the stereoscopic effect is diminished and eyestrain introduced. With the employment of an optical system such as is herein disclosed, and more especially with the use of circularly polarized light for stereoscopic motion picture projection, the observer wearing a suitable viewing glass may tilt his head sideways from the vertical as much as he wishes without in any way affecting the transmission of the circularly-polarized beams through either of the viewing screens. As a result eye strain is eliminated and the possibility of double image reception and impairment of the stereoscopy avoided.

It will be obvious also that elliptically-polarized light may be employed in connection with this application of the invention much in the manner in which it may be employed in connection with automobile headlight glare elimination, and with the same type of limitations.

Other applications of the use of circularly polarized light in optical systems such as have here been described will be apparent. For example, it has been found desirable to equip the beacons or searchlights used on airplane landing fields with light-polarizing devices and to equip the pilots of planes with light polarizers to act as a shield and to eliminate glare from the beacons. The use of circularly polarized light in such an application possesses the distinct advantage that as the plane banks and dips coming onto the landing field, the viewing visor acts to substantially eliminate the glare from the beacons irrespective of the angle at which the plane descends to the field.

Where quarter wave plates are employed, such as sheets of cellulose or cellulosic material of a proper thickness, or a sheet of mica of suitable thickness, for example, the quarter wave plate will ordinarily be a quarter wave plate for a narrow band of wave lengths only and will effect circular polarization of that band and elliptical polarization of the remaining bands in the spectrum. It should, of course, be selected to impart circular polarization to that band of the spectrum in which the user is most interested. For example, in visual work with white light, a quarter wave device should be selected which is a quarter wave plate for the band in the yellow-green to which the human eye is most sensitive.

Combinations of double refracting material may be employed which have the same double refraction throughout the spectrum by selecting members for the combination which have different dispersions of double refraction, but whose dispersions in combination cancel out. With such a combination, circular polarization for all wave lengths may be obtained simultaneously. Furthermore, the use of a Fresnel rhomb, which has heretofore been suggested, may secure substantially circular polarization of the entire spectrum simultaneously.

The preferred embodiments of the invention, which have been shown in the drawing and described heretofore, comprise such a positioning of the respective elements,—the polarizing elements and their associated quarter wave elements,—that difficulties which might otherwise arise, by reason of the circular polarization of a single band in the spectrum only, are eliminated. It will be noted that co-operating emitting screens and viewing screens in an optical system in which the emitted circularly-polarized light is intended to be blocked by the screen have been shown preferably as so positioned that the corresponding axes of the quarter wave devices employed are at right angles to each other, as are the polarizing axes of the polarizing elements employed. When the respective screens are so positioned, and where the same material is employed for the quarter wave devices of the viewing screen and the emitting screen, the entire spectral band is similarly blocked. Where the viewing screen is intended to pass circularly-polarized light, no color is observable whatever the respective positions of the axes of the viewing screen and the emitting screen may be. For example, in Fig. 1 a system is shown in which the viewing screen is composed of a polarizing element with its axis at right angles to the polarizing element of the emitting screen and a quarter wave element with its axes parallel to the corresponding axes of the quarter wave element associated with the viewing screen, whereas in Fig. 2 a system is shown in which the polarizing axes of the polarizing elements associated with the viewing and emitting screens are parallel, while the corresponding axes of the quarter wave elements associated with the two screens are at right angles to each other.

In accordance with the foregoing the term "clockwise polarized light" used in the claims, is intended to refer to light having components of electric intensity, in any plane perpendicular to the propagation of the light, the fluctuations of which are not in phase so that the resultant compound intensity in said plane may be said to change direction constantly in a clockwise manner. Similarly "counter-clockwise polarized light" used in the claims is intended to refer to light wherein the said change in direction is in a counter-clockwise manner. These terms therefore comprehend elliptically polarized light, including as a particular case circularly polarized light, but not the limiting case of plane polarized light.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A visor for viewing polarized light having electric intensity components predeterminedly out of phase, comprising a sheet-like element adapted for polarizing light by absorption and means affixed thereto and cooperating therewith to render said visor substantially opaque to said light, and yet substantially transparent to polarized light having similar electric intensity components oppositely out of phase.

2. A visor for viewing circularly polarized light comprising a sheet of light-polarizing material and a light-transmitting sheet affixed thereto and cooperating therewith to render said visor substantially opaque to said circularly polarized light, and yet substantially transparent to circularly polarized light having electric intensity components oppositely out of phase with respect to those of said first mentioned circularly polarized light irrespective of substantial variation in the angle of intersection of said light and said visor.

3. In a device for the projection of stereoscopic pictures, in combination, means for projecting on a screen an image formed of clockwise polarized light, means for projecting on said screen another image formed of counter-clockwise polarized light, and means to superimpose said images on said screen.

4. In a device for the projection of stereoscopic motion pictures, in combination with means for simultaneously projecting on a screen a plurality of superimposed images, one formed of clockwise polarized light, the other formed of counter-clockwise polarized light, a viewing visor comprising a plurality of viewing screens, one adapted to block clockwise polarized light and to pass counter-clockwise polarized light, the other adapted to block counter-clockwise polarized light and to pass clockwise polarized light.

5. In a projector for stereoscopic motion pictures, means comprising a light-polarizing element and a quarter wave element cooperating to clockwise circularly polarize a beam transmitted thereby, and further means in combination with said first-mentioned means comprising a second light-polarizing element and a second quarter wave element cooperating to counter-clockwise circularly polarize a beam transmitted thereby.

6. In a projector for stereoscopic motion pictures, means comprising a light-polarizing element and a cooperating quarter wave element for projecting a beam of clockwise polarized light, and means comprising a light-polarizing element and a cooperating quarter wave element for projecting a beam of counter-clockwise polarized light, the corresponding axes of said quarter wave elements being substantially parallel and the polarizing axes of said polarizing elements being positioned substantially at right angles to each other.

7. A visor for viewing stereoscopic pictures comprising a plurality of viewing screens, one screen adapted to transmit clockwise polarized light and to block counter-clockwise polarized light, the other screen adapted to transmit counter-clockwise polarized light and to block clockwise polarized light.

8. A visor for viewing stereoscopic motion pictures comprising a plurality of viewing screens, one screen adapted to transmit clockwise polarized light and to block counter-clockwise polarized light, the other screen adapted to transmit counter-clockwise polarized light and to block clockwise polarized light, each of said screens comprising a light-polarizing element and a quarter wave element.

9. A visor for viewing stereoscopic motion pictures comprising a plurality of viewing screens, one screen adapted to transmit clockwise polarized light and to block counter-clockwise polarized light, the other screen adapted to transmit counter-clockwise polarized light and to block clockwise polarized light, each of said screens comprising a light-polarizing element and a quarter wave element, the corresponding axes of the quarter wave elements being positioned substantially parallel to each other and the polarizing axes of the polarizing elements being positioned substantially at right angles to each other.

10. A visor for viewing stereoscopic motion pictures comprising a plurality of viewing screens, one screen being adapted to block clockwise circularly polarized light, the other screen being adapted to block counter-clockwise circularly polarized light, each screen being adapted to transmit light blocked by the other screen, and each screen comprising a light-polarizing element and a quarter wave element, the axes of the quarter wave elements being positioned at an angle of 45° to the polarizing axes of the light-polarizing elements.

11. In combination, a projector for stereoscopic pictures adapted to simultaneously project a plurality of beams and to superimpose said beams on a reflecting surface, one of said beams being clockwise circularly polarized, the other of said beams being counter-clockwise circularly polarized, and a visor for viewing said superimposed beams comprising a plurality of viewing screens, one adapted to block clockwise circularly polarized light, the other adapted to block counter-clockwise circularly polarized light, each of said screens being adapted to transmit circularly polarized light blocked by the other of said screens, and each of said screens being adapted to function in the manner described irrespective of the position of the viewing visor.

12. An analyzer for circularly polarized light comprising a plurality of united set sheets of plastic material, one of said sheets being adapted to plane polarize transmitted light and the other of said sheets comprising cellulosic material, the molecular orientation of said second sheet being at an angle of approximately 45° to the orientation of the polarizing axis of the first sheet.

13. A flexible light-wave filtering sheet unit comprising a flexible plastic plane-polarizing sheet, a flexible fractional wave retardation sheet, and means comprising a transparent binding layer positively affixing the transmitting surface of the retardation sheet to the adjacent surface of the polarizing sheet with the optical axes of the retardation sheet at a predetermined angle to the polarizing axis of the polarizing sheet, and with the surface of either sheet intersecting any light beam normal to the surface of the other sheet.

EDWIN H. LAND.